Figure 1:
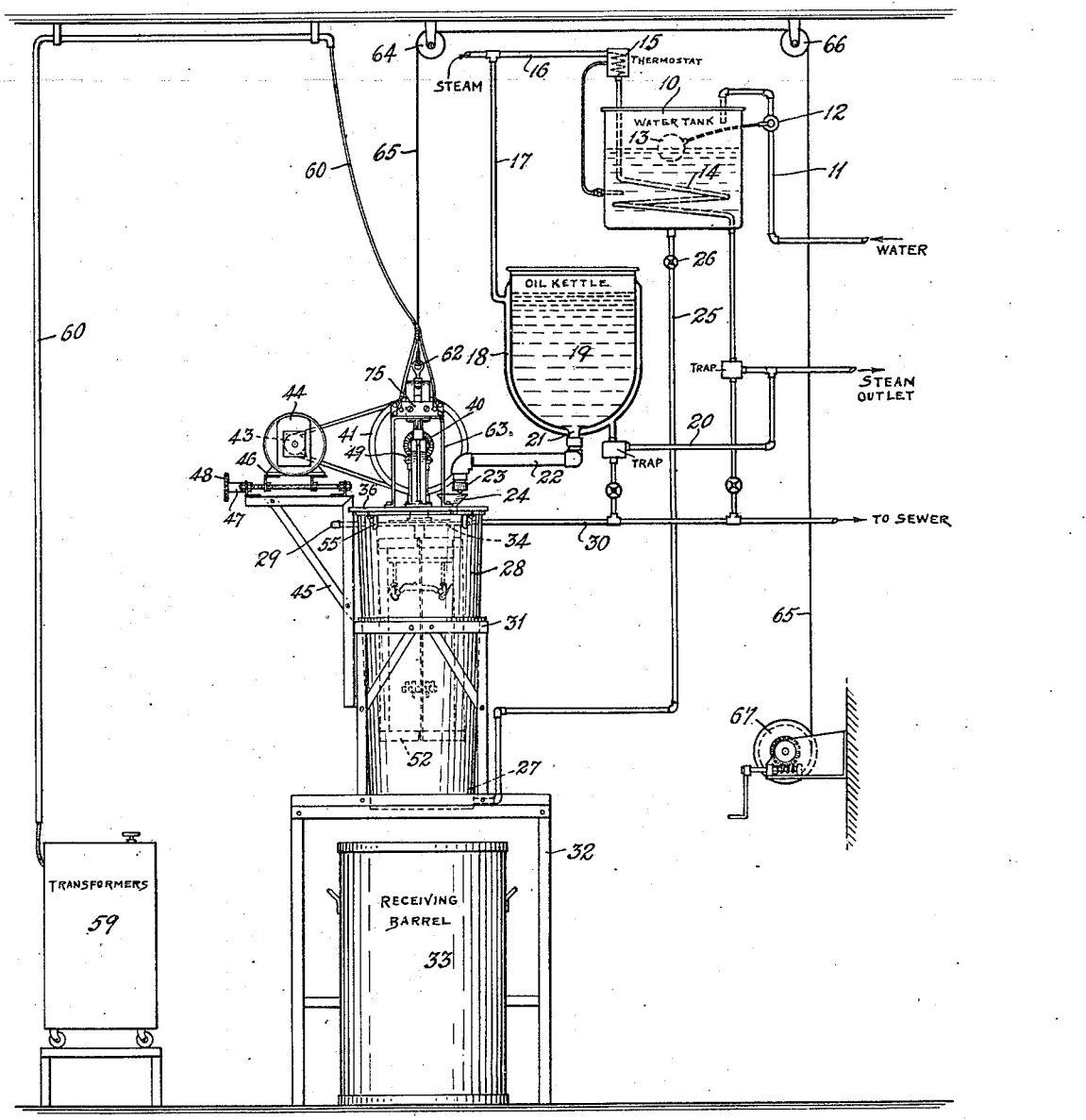

May 7, 1940. C. HOLT 2,199,796
METHOD OF IRRADIATING CREAMS AND APPARATUS THEREFOR
Filed Jan. 6, 1938 3 Sheets-Sheet 1

WITNESS
INVENTOR
CHANDLER HOLT
BY
ATTORNEYS

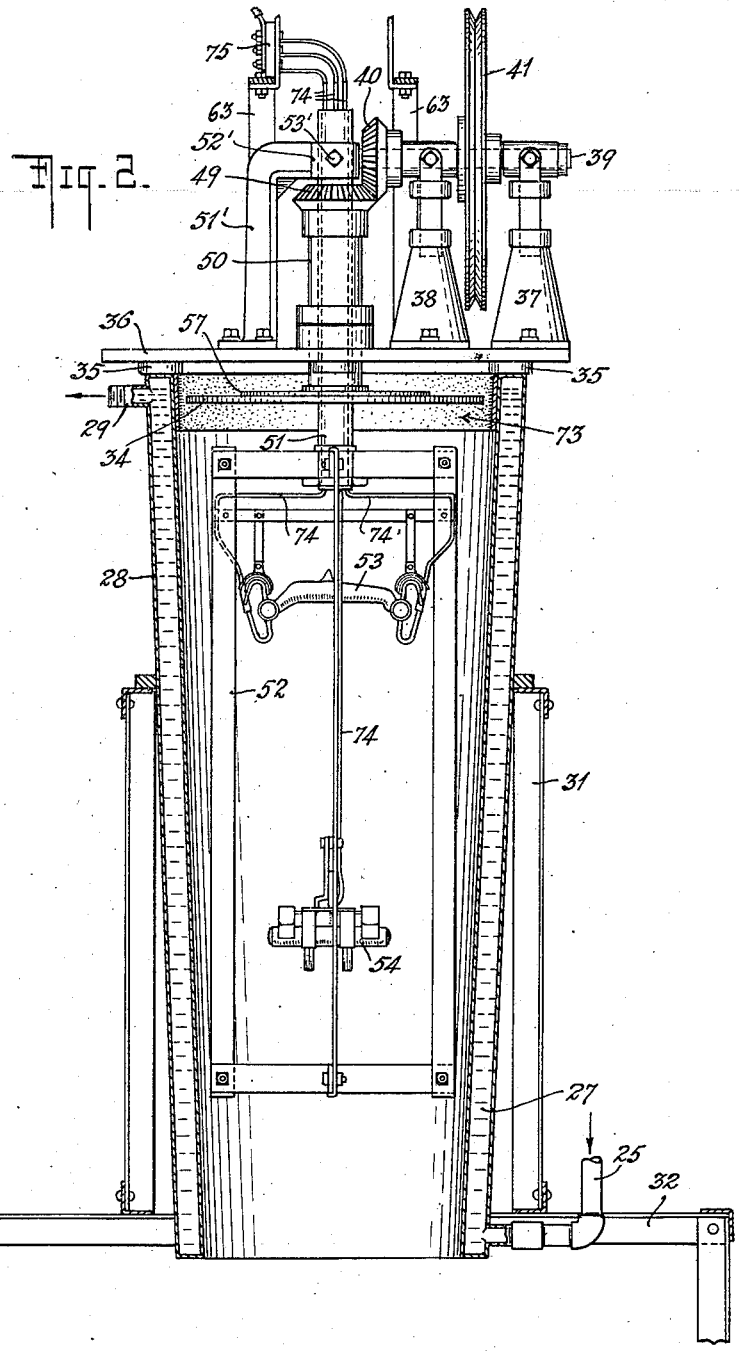

May 7, 1940.     C. HOLT     2,199,796
METHOD OF IRRADIATING CREAMS AND APPARATUS THEREFOR
Filed Jan. 6, 1938     3 Sheets-Sheet 3
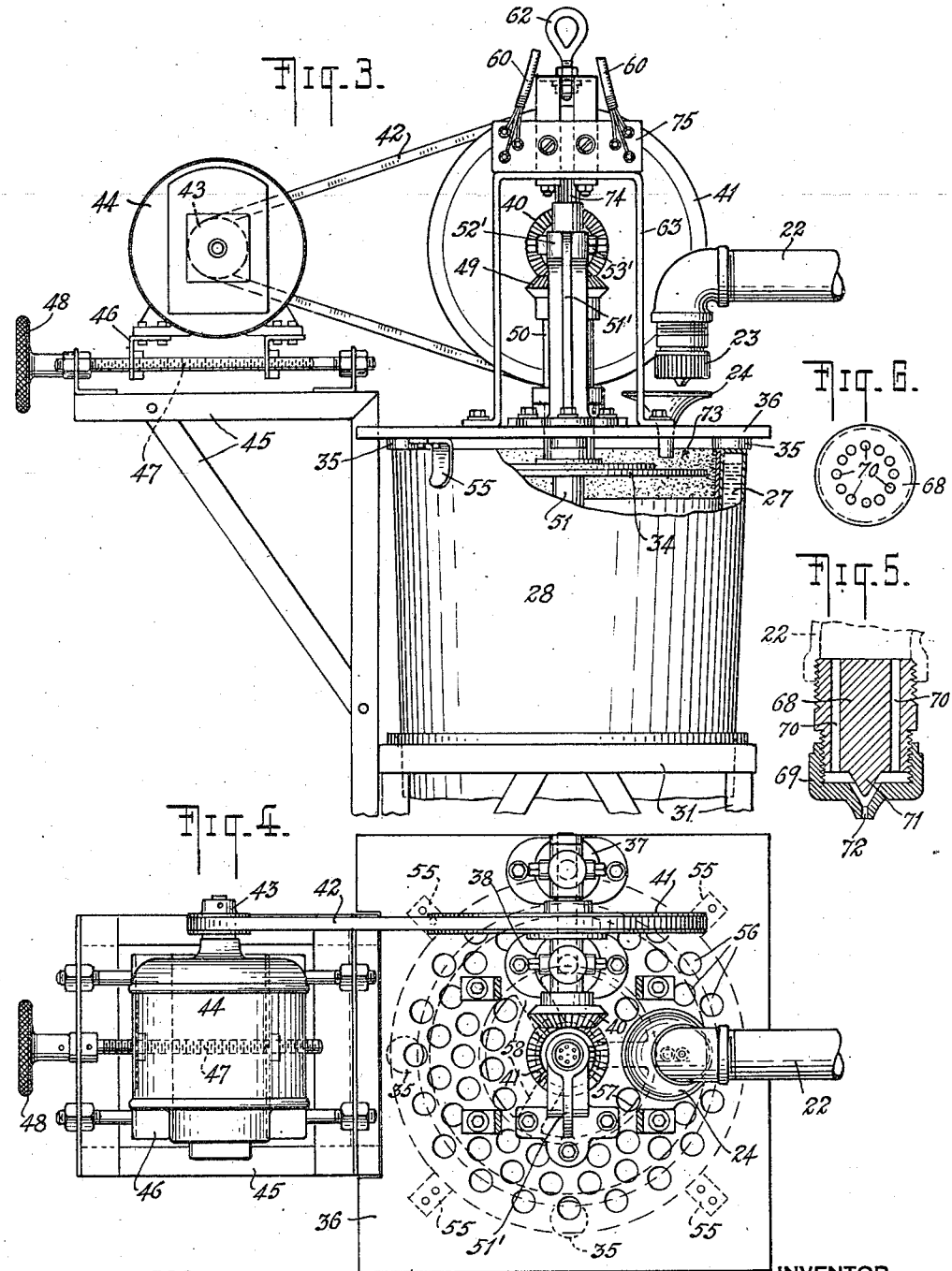
WITNESS
G. V. Rasmussen
INVENTOR
CHANDLER HOLT
BY
ATTORNEYS Patented May 7, 1940

2,199,796

UNITED STATES PATENT OFFICE 2,199,796

METHOD OF IRRADIATING CREAMS AND APPARATUS THEREFOR

Chandler Holt, Rochester, N. Y., assignor to Bourjois, Inc., New York, N. Y., a corporation of New York Application January 6, 1938, Serial No. 183,574

7 Claims. (Cl. 167—91)

The invention relates to a method of irradiating creams, or oils constituting a base for creams, which, by application to the skin, produce specific therapeutic effects in the correction of certain disorders or skin conditions which have been previously found to resist ordinary treatment, and to an apparatus for carrying out such method of irradiation. In its broadest aspect, the invention relates to a method and apparatus for producing the standardization of a cream, such as an anhydrous cream, by the production therein by irradiation of active oxygen derived from the peroxidic bodies contained within the oil or oils constituting an ingredient of the cream.

The standardization of the cream by the production of such active oxygen from such peroxidic bodies is demonstrable by certain tests in which the peroxidic strength of the bodies, having a power of liberating iodine from certain test solutions, may be estimated by a procedure including, as a specific example, titration with a standard sodium thiosulfate solution. The carrying out of such test depends upon the fact that the iodine liberated by the peroxidic body from the test solution, for instance, acidic potassium iodide solution, may be titrated to original color with a standard sodium thiosulfate solution, a definite quantity of such standard sodium thiosulfate solution indicating the presence, upon titration to original color, of a definite quantity of active oxygen in the oil. For instance, each cubic centimeter of sodium thiosulfate solution, upon titration of the liberated iodine therewith to original color, is indicative of the presence of .008 gram of oxygen.

The so-called "oxygen point," as used in the specification hereinafter, is defined as the percentage of oxygen, as determined by the above test, times 1000.

I have found that by the method of irradiation hereinafter described, and in carrying out such method by my novel apparatus, I am enabled to raise the oxygen point, and thereby standardize the cream by active oxygen, to between 38 to 125 oxygen points. In the irradiated base prepared in accordance with my method and with my apparatus hereinafter described in detail, I attain an oxygen reading, as shown by the test above described, of 125. This degree of standardization of the base and, therefore, of the cream, I find most efficacious for the production of those therapeutic effects which have been noted by previous investigators as attained by the use of irradiated oils in the correction of skin disorders upon the application of the cream as an inunction.

The base which I irradiate in accordance with my novel method and with my novel apparatus, preferably comprises a mixture of approximately equal parts of lanolin and maize oil with a small percentage of wax contained therein.

It will be obvious, however, that other kinds of oil, for instance, sesame, and olive oil, may be combined with lanolin as the base. A mixture of lanoline oil and oleic acid may also be advantageously irradiated to produce active oxygen and also to replace the fats on the skin taken off by soap since these fats demonstrate an acidic reaction.

I have found by extended experimentation that the amount of active oxygen produced by the irradiation, is dependent upon the intensity of the ultra-violet light and radiation produced by the lamps. It is dependent also, in greater measure, upon the degree of activation, which in turn depends upon the thickness of the film of material exposed to the irradiation.

This factor, namely the thickness of the film subjected to the irradiation, is a most important one, since the penetration of the ultra-violet rays of light through the film, is only about one millimeter. In order to attain the necessary degree of irradiation by the penetration by the ultra-violet light of the film substantially throughout its thickness, the film must be maintained as thin as economically possible. Furthermore, the film must, during the process of irradiation, be constituted of such form and must be so disposed over the surface over which it travels in the course of the irradiation, as to cause the particles constituting the film, to roll over and over, so that as much of the body of the film and as much of the surfaces of the particles constituting it, are exposed to the irradiating rays as possible.

In accomplishing these objects, a careful control of the temperature of the film is necessary, as too low a temperature will cause an increase in the viscosity of the oil, so that the oil flows much too slowly and in too thick a film. Too high a temperature, on the other hand, produces an extremely thin film and the duration of the time of passage through the area of irradiation is too fast. Proper control of the temperature of the film of oil is, therefore, of the utmost importance.

As in carrying out the irradiation, in accordance with my invention, I use quartz mercury vapor lamps, the use of a high temperature would also result in the reduction of the ultra-violet output of the lamps, which are designed to operate at greatest efficiency and with a maximum radiation output, at less than 200° F. If, therefore, the temperature in the field of irradiation is raised above such point (200° F.), the ultra-violet output of the lamps or tubes would be appreciably decreased and there would be introduced a variation in the degree of irradiation and in the ultimate effect obtained.

For carrying out my novel method of irradiating a base, such as hereinabove indicated, I use an apparatus so designed as to produce the desired thickness of film and to have such film pass through the area of irradiation at the rate, temperature, and thickness of film most efficacious in producing a product having the desired characteristics. The apparatus, in its broadest aspect, includes a chamber constituted of a water jacketed nickel inverted truncated cone, open at the top and at the bottom, the cone being tapered toward its bottom end and being provided near the top opening thereof with a revolving distributing disc upon the upper surface of which the oil to be irradiated is dropped by gravity and thence by the centrifugal force of such revolving disc, the oil, in drops or more accurately, in droplets, is thrown onto the inner surface of the cone along which it runs downwardly in a uniform, even thickness of film, the film being exposed to ultra-violet light emanating from two mercury quartz vapor lamps positioned within, and substantially axially, of the cone.

An important feature of my novel apparatus resides in the provision of an area constituting a rough surface disposed throughout the inner peripheral surface of the cone near the top thereof and opposite the peripheral edge of the revolving distributing disc, for the purpose and function hereinafter more specifically described.

My novel apparatus includes a variety of refinements and appurtenances designed to overcome certain problems encountered in the design and assembly of the various mechanisms and elements to produce a practical and commercially feasible structure for carrying out my novel method and the functioning of the apparatus in a manner to attain the desired ends. Such problems relate primarily to questions of maintenance of proper temperature, the production and maintenance of the proper thickness of film of the product to be irradiated, ventilation, the provision of an accurately operative device for the uniform feeding of the product to the area of irradiation, and facilities for cleaning the apparatus and the replacement and repair of parts thereof.

A particular embodiment of the apparatus is shown by way of example, rather than by way of limitation, in the accompanying drawings, in which Fig. 1 shows the general layout of the complete system for effecting the irradiation and of the various mechanisms entering into the proper operation of the apparatus and the carrying out of the method; Fig. 2 is a vertical section through a portion of the apparatus, particularly of the irradiating mechanism and its associated parts; Fig. 3 is a front view of the upper portion of the irradiating cone with a part thereof broken away, and of the portions of the apparatus in proximity to the upper portion of the cone; Fig. 4 is a plan view of the parts of the apparatus shown in Fig. 3; Fig. 5 is a vertical section through the adjustable nozzle structure by means of which the material to be irradiated is fed to the cone; and Fig. 6 is a plan view of the nozzle shown in section in Fig. 5.

Referring more particularly to the drawings, in which similar reference characters identify similar parts in the several views, the general organization of the apparatus is illustrated in Fig. 1. In such figure, 10 is a water tank to which water is supplied from the city main through pipe 11, a valve 12, having a float 13, being effective to maintain a constant level of water in the tank. The supply tank contains a steam coil 14 equipped with a thermostat 15 controlling the supply of steam to the coil so as to maintain the temperature of the water within the tank substantially constant at approximately 140° F.

Steam to the coil 14 is supplied through pipe 16 leading to the thermostat. Steam from the same source of supply is led through pipe 17 to the jacket 18 of the oil supply kettle 19. Such supply kettle is fabricated entirely of nickel, such material being used throughout the system, except in particular instances hereinafter referred to, as nickel has no deleterious effect on the animal and vegetable products embodied in the oil irradiated. Steam from the jacket of the oil supply kettle, after circulating through such jacket, is led through pipe 20, to the steam outlet.

In the bottom of the oil supply kettle is an outlet 21 to which is attached a pipe 22, which may be swung about its point of juncture to the outlet 21, and which carries at its free end the adjustable nozzle 23 hereafter described in greater detail.

The oil to be irradiated, supplied from the kettle 19 through the pipe 22, falls by gravity from the aperture in the nozzle 23 into a funnel 24. Such funnel is approximately three inches in diameter at the top, the opening at the end of the stem thereof being approximately one-quarter of an inch in diameter.

Heated water from the tank 10 is led through pipe 25, a valve 26 being interposed in such pipe, to the bottom of the jacket 27 surrounding a cone 28, made of nickel, such cone being open both at the top and at the bottom, the hot water passing up through the jacket of the cone to the outlet 29 thereof and thence through pipe 30 to the sewer.

The nickel cone 28 is supported within a frame structure 31 upon another frame 32, a receiving barrel 33 being positioned directly beneath the lower open end of the cone, into which barrel the irradiated oil falls by gravity after passing along the inner surface of the cone as hereinafter described.

Within the cone 28, near the upper open extremity thereof, is positioned a revolving aluminum distributing disc 34 (see Figs. 2 and 3). Mounted upon the upper end of the cone 28, seated upon the spacer discs 35, is a plate 36 through which extends at an appropriate position, the stem of the funnel 24, the end of the stem being approximately one-half inch from the top surface of the revolving distributing disc 34.

At one side of the plate 36 and secured to the top surface thereof, are standards 37 and 38 supporting, in bearings at their upper extremities, a shaft 39 having at the end thereof near the axial line of the cone 28, a mitre gear 40. Upon the shaft 39, intermediate the bearings upon the standards 37 and 38, is mounted a pulley 41 rotated by a belt 42 passing over a smaller pulley 43 secured to the shaft of a motor 44. The motor is permanently mounted upon a frame 45 at the side of the cone, upon a sliding bed 46 movable along a threaded bolt 47 by turning the knurled wheel 48. By moving the motor upon its sliding bed by turning the wheel 48, the belt 42 may be removed from the pulleys 41 and 43 or either of them, so that the structure disposed interiorly of the cone, including the lamps and the oil distributing mechanism, may be raised.

The mitre gear 40, upon the end of the shaft 39, meshes with a mitre gear 49 secured to a vertical shaft 50, which shaft is constituted of a sleeve, to the bottom end of which is secured the distributing disc 34, so that rotation of the shaft by pulley 41 is transmitted by the mitre gears 40 and 49 to the distributing disc 34.

Housed within the sleeve shaft 50 is a tube 51 supported from standard 51' and secured within bearing 52' by bolts 53', to the lower extremity of which tube is secured a frame 52 supporting two quartz mercury lamps 53 and 54, suspended at right angles to each other, in order to give as complete and as large effect as possible, it being recognized that a quartz mercury burner has very little intensity at its ends. The frame 52 is made of polished aluminum, a metal which has been found to reflect more ultra-violet light than any other. Absorption of light, to any great extent, before reaching the film of oil to be irradiated, is thus prevented.

Depending from the plate 36 and suitably disposed along the peripheral edge thereof, are four spring fingers 55 effective to centralize the plate 36 and the mechanism supported thereon and therefrom, axially of the cone 28. Such spring fingers are adapted to contact the outer surface of the cone and by means of their outwardly curved extremities insure the proper seating of the plate 36 centrally upon the cone.

For reasons hereinafter more fully explained, the plate 36 is provided with a large number of apertures 56, such apertures being cut through the plate 36 wherever practicable.

The rotating distributing disc 34 is constructed with an integral flange member 57 which, however, is cut out so as to form three spokes 58, such spokes being so shaped as to give a slight suction when the disc 34 revolves so as to force air against the plate 36 and through the apertures therein.

Referring now more particularly to Fig. 2, the quartz mercury burners 53 and 54 are of conventional design, of the type known as Hanovia type B and operate on 220 volts A. C. Each burner has a transformer, such unit being designated generally at 59 in Fig. 1, the unit containing also a rectifying outfit, as the burners are designed to start on direct current and as the lamps warm up, more and more alternating current is supplied, until only a small amount of direct current is finally used. The burners require an initial warm-up period of approximately five minutes before their ultra-violet output reaches 100%. The current is supplied from the transformers 59 through wires in a flexible cable 60 in well-known manner, not part of the present invention, and therefore not described in detail. A rheostat (not shown) is also included in the system to give a small range of variations sufficient to compensate in some measure for the aging of the burners.

To raise and lower the movable unit, including all of the mechanism supported upon and by the plate 36, an eye bolt 62 is attached to a frame 63 fastened to the plate 36 in such a way as to support such plate and the mechanism depending therefrom in true balance. On the ceiling directly centrally overhead of the cone 28 is a pulley 64 through which a steel cable 65 is passed, the cable being attached at its lower end to the eye bolt 62. From the pulley 64 the cable passes through another pulley 66 positioned near the wall of the room and directly over a hand-operated winch 67. When the unit is raised by operation of the winch, the burners may be lighted by a slight shaking thereof in conventional manner.

Turning now to a description of the variable nozzle 23, such nozzle comprises a stud 68 threaded at one end to engage the internal threads of the end of the pipe 22, or rather the elbow secured to the end thereof, and threaded at its other end to receive an adjustable internally threaded nozzle element 69. The stud 68 is provided with a concentrically arranged series of apertures 70 running throughout the length thereof and with a depending valve element 71 adapted to be brought into proximity to the nozzle opening 72. The entire nozzle is made of bronze and is completely plated so as to reduce the possibility of corrosion. The rate of flow is governed by the degree of rotation of the nozzle element 69 upon the stud 68 and in order to maintain the same rate of flow the nozzle element 69 is preferably marked in degrees so as to make duplicate settings capable of accomplishment with facility and dispatch.

When the oil to be irradiated, flowing through the nozzle 23 and through the funnel 24, drops by gravity upon the revolving distributing disc 34, there is present sufficient centrifugal force to throw the oil onto the inner surface of the cone. However, not all of the droplets of oil leave the edge of the disc at exactly a true tangent and these droplets tend to hit the oil covered surface and glance off, falling straight downwardly at such a high rate of speed that no irradiation of the oil is possible. Furthermore, when the drops come into contact with the hot frame supporting the lamps, they are polymerized to a thick gum. Some of the drops may even hit the quartz burners producing a very marked lowering of the ultra-violet intensity. To counteract these defects, I provide the inner top surface of the cone with a rough lining that is effective to catch every drop of oil thrown against it. Such rough surface may be constituted of any fabric having a high nap, but as it has been found that it is necessary to have a hard backing to produce a good surface capable of being glued to the cone, a fabric constituted of a silk velvet ribbon approximately two inches in width, has been found to be most efficacious. In the drawings, I have designated such velvet ribbon at 73, the ribbon being firmly fastened to the interior surface of the cone with a non-drying glue such as glucose. I prefer to use a white velvet ribbon to prevent any color contamination of the oil being irradiated. Of course, the ribbon must be replaced from time to time, as the nap thereof becomes coated with polymerized oil, so that it no longer exhibits a surface roughness.

A specific problem in the installation of the burners in the present apparatus was that of protecting the wires inside the cone from heat and oil vapors. This problem was solved by encasing the wires leading to the burners in Pyrex glass tubing 74 bent to fit the particular position needed. The tubes of Pyrex glass are, as shown clearly in Fig. 2, led up through the stationary tube 51, inside the sleeve shaft 50 driving the distributing disc. The tubes are led to a contact block 75 where contact is made with the wires encased within a flexible cable 60. The flexible cable 60 makes movement of the lamps and distributing unit into and out of the cone possible.

The ultra-violet light emanating from the type of mercury quartz vapor lamps hereinabove specified and to which the material to be irradiated in accordance with my invention is exposed, is principally of wave lengths concentrated at 3650, 3654 and 3984 Angstrom units.

It will be noted that the cone 28 is of somewhat elongated form as it is essential to have the film of oil trickling down the inner surface of the cone as near to the source of ultra-violet light as possible. Ultra-violet light, like visible light, loses its intensity in inverse proportion to the square of the distance from the source.

As mentioned hereinabove, since the penetration of the ultra-violet light impinging upon the film is only about 1 millimeter, the maintenance of the thickness of the film at not appreciably more than 1 millimeter is essential. As the thickness of such film is also directly affected by the speed at which the oil is permitted to drop upon the revolving distributing disc, the desired thickness of film may be obtained by varying the opening of the oil supply. I have found that the thickness of the film during ordinary production, may be maintained at 1.5 millimeters and still secure the necessary degree of penetration by reason of the tendency of the component droplets of the film to roll over and over. The entire film is thus exposed to the irradiation.

It is to be understood, of course, that the thickness of the film may be standardized to changes in the ingredients of the material to be irradiated, depending upon the viscosity of such material, as such viscosity affects the ability of the particles constituting the film to roll and thus have all of their surfaces exposed to the ultra-violet light.

While I have described an apparatus embodying a single cone, it is obvious that the general system of supply of steam, water, and oil may be adapted to a series of irradiating cones. Thus, in practice, the system has been adapted for supplying two irradiating cones, in which case the oil supply kettle has been provided with two openings and pipes, one for each irradiating cone. The water circulating in the jacket of the cone may then be passed from the top of one cone to the bottom of the next and then out the top of such second cone into the sewer.

In the installation using two irradiating cones, the oil supply kettle 19 may conveniently hold 20 gallons of the material to be irradiated, the same supply being thus capable of being used for both irradiating cones. Variable nozzles like 23 at the ends of each of the pipes from the outlets of the oil kettle may be used separately and at different speeds of feeding.

For effecting the most economical operation of the apparatus as illustrated, in order to produce 8 lbs. of irradiated base per hour, giving an oxygen reading of 125, the distributing disc is driven by a quarter horsepower motor at 1725 R. P. M., geared down by the two pulleys and the belt 42, to 240 R. P. M.

The correct speed of the distributing disc, at approximately 240 R. P. M., was determined after many experiments, indicating that any great increase in speed of rotation of the disc shatters the drops and produces splashing, while a decrease in such speed does not give the necessary force for adherence of the particles.

While I have indicated hereinabove the theory underlying the standardization of the base by the production of active oxygen in the oil upon irradiation, it should be understood that such theory is entirely hypothetical as I am aware that certain chemical, as well as physical changes, in the oil upon irradiation may be demonstrated. For instance, I have found that the viscosity of the oil is increased slightly, that the iodine number thereof may fall slightly, and that there may be a bleaching or an increase in color, depending upon the nature or composition of the oil being irradiated. These changes may conceivably be due to a rearrangement of the double bonds chemically, in the substance produced by the ultra-violet light.

As the intensity is very considerable, all determinative readings are preferably made by the use of a photoelectric cell placed approximately 12 inches below the bottom of the cone. The average reading at this point has been found to be approximately 8000 micro-watts per square centimeter per second.

While I have described a specific embodiment of my novel apparatus, it is obvious that various changes therein, particularly in the arrangement, configuration, and disposition of the several parts thereof, may be made without departing from my invention.

I claim:

1. The method of irradiating a cream base by producing active oxygen from the peroxidic bodies contained therein, which comprises heating the base to a temperature of approximately 180° F., flowing the base onto a revolving disc effective to cause the drops thrown therefrom to impinge upon a rough surface from which they trickle in a thin uniform film of approximately 1.5 m. in thickness over an area in proximity, and so as to be exposed, to ultra-violet light radiation from a quartz mercury vapor lamp in an atmosphere of a temperature of below 200° F., while the base in such thin film passes over a tapered conical plane surface, and then removing the base from such tapered surface.

2. In an apparatus for irradiating a cream base by irradiation, the combination of an inverted truncated cone open at the top and at the bottom and having a plane interior surface throughout its length, a quartz mercury vapor lamp disposed within said cone, a revolving distributing disc positioned near the top opening of said cone, said cone having a strip of pile fabric having a high nap and a hard backing throughout the inner peripheral surface near the top thereof and opposite the peripheral edge of the revolving distributing disc.

3. An apparatus for irradiating a cream base, which comprises a conical chamber open at the top and bottom ends thereof, and tapering towards the bottom and having a plane interior surface throughout its length, a cover having a multiplicity of perforations for said conical chamber, a disc having a ribbed flange and mounted for revolution centrally and near the upper open end of said cone, a fixed shaft extending through said cover plate and said revolving disc, a frame secured to said fixed shaft and supporting a pair of mercury quartz vapor lamps, and means for feeding the base to be irradiated through said perforated cover plate to the upper surface of the revolving disc.

4. An apparatus as claimed in claim 3, in which the revolving disc is provided with a centrally disposed flange having a plurality of ribs whereby ventilating currents of air are forced against the apertured cover plate of the cone.

5. An apparatus as claimed in claim 3, in which the inner surface of the cone substantially opposite the revolving disc is provided with a pile fabric surface having a high nap and a hard backing.

6. An apparatus as claimed in claim 3, in which the inner surface of the cone substantially opposite the revolving disc has secured thereto a ribbon constituted of a napped fabric material.

7. An apparatus as claimed in claim 3, in which the inner surface of the cone substantially opposite the revolving disc has secured thereto, by an adhesive, a strip of white velvet material.

CHANDLER HOLT.